(12) United States Patent
Oezkan et al.

(10) Patent No.: US 8,678,433 B2
(45) Date of Patent: Mar. 25, 2014

(54) MOTOR VEHICLE HAVING A FIXED ROLLOVER BAR

(71) Applicant: Dr. Ing. h.c.F. Porsche Aktiengesellschaft, Stuttgart (DE)

(72) Inventors: Ali Oezkan, Leonberg (DE); Heiko Geissinger, Ilsfeld (DE); Andreas Schramm, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/908,250

(22) Filed: Jun. 3, 2013

(65) Prior Publication Data

US 2013/0320657 A1   Dec. 5, 2013

(30) Foreign Application Priority Data

Jun. 4, 2012   (DE) .......................... 10 2012 104 812

(51) Int. Cl.
*B60R 21/13* (2006.01)
(52) U.S. Cl.
USPC ........................................................ 280/756
(58) Field of Classification Search
USPC ........... 280/756; 296/107.08, 107.09, 107.11, 296/107.15, 107.17, 135
See application file for complete search history.

(56) References Cited

U.S. PATENT DOCUMENTS

| | | | |
|---|---|---|---|
| 8,205,929 B2* | 6/2012 | Ugolini et al. | 296/107.17 |
| 8,459,719 B2* | 6/2013 | Schulzki et al. | 296/107.08 |
| 2008/0061542 A1* | 3/2008 | Froschle et al. | 280/756 |
| 2012/0153665 A1 | 6/2012 | Schulzki et al. | |

FOREIGN PATENT DOCUMENTS

| | | |
|---|---|---|
| DE | 10 2008 027 892 | 12/2009 |
| DE | 10 2010 055 038 | 6/2012 |
| EP | 0 845 378 | 6/1998 |

OTHER PUBLICATIONS

German Search Report of May 19, 2013.

* cited by examiner

*Primary Examiner* — Faye M. Fleming
(74) *Attorney, Agent, or Firm* — Gerald E. Hespos; Michael J. Porco; Matthew T. Hespos

(57) ABSTRACT

A motor vehicle (1) has a fixed rollover bar (8) that spans a passenger compartment of the motor vehicle. The motor vehicle (1) also has removable roof (16) that can be moved between a closed position where the roof (16) is arranged between a windshield frame (2) and the rollover bar (8) and a storage position where the roof (16) is behind the rollover bar (8). A linkage (15) is mounted to a vehicle body (19) behind the rollover bar (8) and can be articulated for moving the roof (16). Links (20, 21) of the linkage (15) lie in depressions (11, 23) on the rollover bar (8) when the roof (16) is in the closed position. Buffer elements (22) are between the links (20, 21) and the rollover bar (8).

12 Claims, 3 Drawing Sheets

MOTOR VEHICLE HAVING A FIXED ROLLOVER BAR

CROSS REFERENCE TO RELATED APPLICATION

This application claims priority under 35 USC 119 to German Patent Appl. No. 10 2012 104 812.6 filed on Jun. 4, 2012, the entire disclosure of which is incorporated herein by reference.

BACKGROUND

1. Field of the Invention

The invention relates to a motor vehicle with a removable roof and a fixed rollover bar that spans a passenger compartment of the motor vehicle.

2. Description of the Related Art

Positional indications which are given in the above text and in the following description relate to the forward driving direction of the motor vehicle.

EP 0 845 378 A1 discloses a motor vehicle with a removable roof and a fixed roll bar that spans a passenger compartment of the motor vehicle. The removable roof is articulated so that it can be moved via a linkage behind the rollover bar on a vehicle body. Thus, the roof can be moved from a closed position, in which the roof is arranged between a windshield frame and the rollover bar, to a storage position, in which the roof is arranged behind the rollover bar. Longitudinally directed embossed portions are formed in laterally outer regions of the upper, transversely running section of the rollover bar. Links of two link pairs of the linkage lie in sections on the upper side of the embossed portions when the roof is in the closed position. The embossed portions in the rollover bar are relatively wide, and thus can receive the links of the respective link pair with a relatively great lateral play. The links therefore are guided only vertically.

Considerable torsion forces with regard to the longitudinal axis of the vehicle body act on the vehicle during driving. These torsion forces lead to a twisting of the vehicle about its longitudinal axis and therefore also to displacement of the bearing points of the links with regard to the rollover bar. The displacement of the bearing points of the removable roof is undesirable and can affect the precise arrangement of the roof in its closed position.

An object of the invention is to provide a motor vehicle that ensures defined mounting of the links of the linkage in the rollover bar despite the introduction of torsion forces with regard to the longitudinal axis of the vehicle body.

SUMMARY OF THE INVENTION

The invention relates to a motor vehicle where the links of the linkage that moves the roof are fixed both vertically and laterally relative to the rollover bar when the roof is in the closed position. The links are mounted in the rollover bar via buffer elements that are made of an elastic material. The elastic buffer elements achieve a defined resilient mounting of the links in the rollover bar in two coordinate directions. The buffer elements are active in the lateral extent of the vehicle to ensure lateral fixing of the links with regard to the rollover bar. However, the fixing preferably is slightly resilient in the lateral direction and in the vertical direction, which is the direction of the support of the respective link on the rollover bar.

The rollover bar may have two upright side beams and an upper, transversely running bar section that connects the side beams. The transversely running bar section preferably has at least one depression in the region of each side beam, and the roof is mounted on the vehicle body side via links of the linkage in the region of each side of the motor vehicle.

The transverse bar section preferably has a single depression in the region of each side beam. One or two links can be mounted in the region of the single depression in the closed position of the roof. Alternatively, the transverse bar section may have two laterally adjacent bar sections in the region of each side part. One link then can be mounted in each depression in the closed position of the roof.

The buffer elements may be connected to the links. In this embodiment, the rollover bar need not be equipped with the buffer elements in the region of its depressions. The respective buffer elements of this embodiment may be configured to enclose a link. More particularly, the buffer elements may be annular elements that enclose the respective links. Each buffer element preferably is connected fixedly to the link to prevent displacement of the buffer element in the longitudinal direction of the link. Thus, the link always is deposited with the buffer element on the rollover bar in a defined manner, via guides of the roof in its closed position.

Buffer elements that are connected to the links can be positioned and configured to bear exclusively on the rollover bar. Accordingly, in the closed position of the roof, the respective buffer element comes into contact only with the rollover bar. On the other hand, if the buffer element bears against the rollover bar and against the buffer element of the other link, a plural links interact with the rollover bar via their buffer elements in the closed position of the roof. The two links are assigned to the same depression and are close to one another. Thus, the two links make contact with one another in the closed position of the roof and bear in each case against the rollover bar. This design also ensures that the links with their buffer elements are fixed perpendicularly on the rollover bar by the buffer elements resting on the rollover bar, but also are fixed laterally by bearing against both sides of the depression.

According to another design, the buffer elements are connected to the rollover bar. Thus, the respective buffer element is open on its side that faces away from the transverse bar section. Each opening cross section can be of different shape, such as U-shaped or V-shaped. This V-shaped opening advantageously fixes the link laterally as the link is lowered into the assigned buffer element. The respective buffer element preferably has a downward taper, in particular conical taper for receiving a single link.

This downwardly tapering receiving cross section of the depression automatically centers the link in the transverse direction of the vehicle as the link is lowered onto the rollover bar.

The individual links of the linkage lie above the rollover bar in the closed position of the roof and optionally are covered above the rollover bar by a cover in the closed position. The stored roof is fixed with respect to the rollover bar precisely both to the bottom and on both sides. The buffer elements are attached to the rollover bar or to the links and interact with the links or the rollover bar in a positively locking manner. The buffer elements preferably are produced from an elastic material.

Torsion forces introduced into the motor vehicle with regard to the longitudinal axis of the vehicle body cause a certain twisting of the motor vehicle. However, the invention ensures that no gaps are formed between the rollover bar and the links. Accordingly, no gap formation is to be noted between the roof and the rollover bar. The roof may be configured from individual roof segments that optionally are assigned a fabric covering, This design ensures that no increased forces are introduced into a fabric covering assigned to the individual roof segments.

Further features of the invention will be apparent from the appended drawing and the description of the exemplary embodiments that are illustrated in the drawings.

DETAILED DESCRIPTION OF THE PREFERRED EMBODIMENTS

Figure 1:
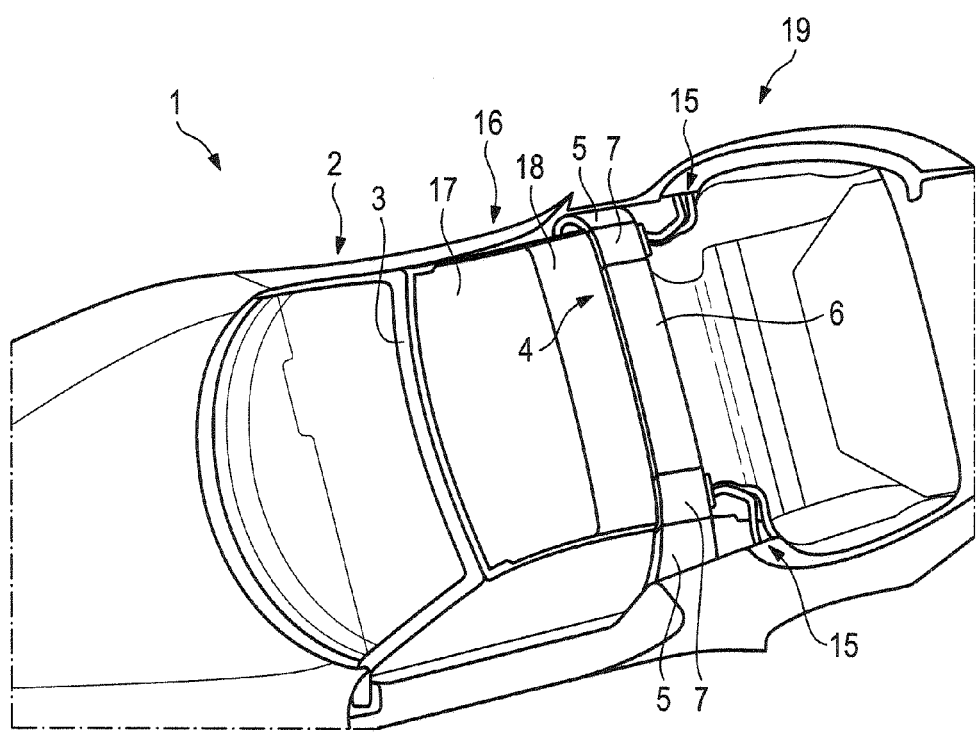
FIG. 1 is a three-dimensional view of a motor vehicle shown in greatly simplified form and viewed obliquely from above and the side.

FIG. 1 illustrates a passenger motor vehicle 1 in a Targa embodiment. The passenger motor vehicle 1 has a windshield frame 2 or windshield cowl with an upper frame section 3, and a fixed rollover bar that spans a passenger compartment of the passenger motor vehicle 1. The trim 4 of the rollover bar is illustrated and has two upright trim sections 5 and a trim section 6 that runs transversely. A movable trim section 7 is provided between the trim section 6 and the trim section 5 and faces the trim section 5. A covering position of the trim section 7 is illustrated in the FIG. 1, but a section of the rollover bar situated below the trim section 7 can be exposed.

Figure 2:
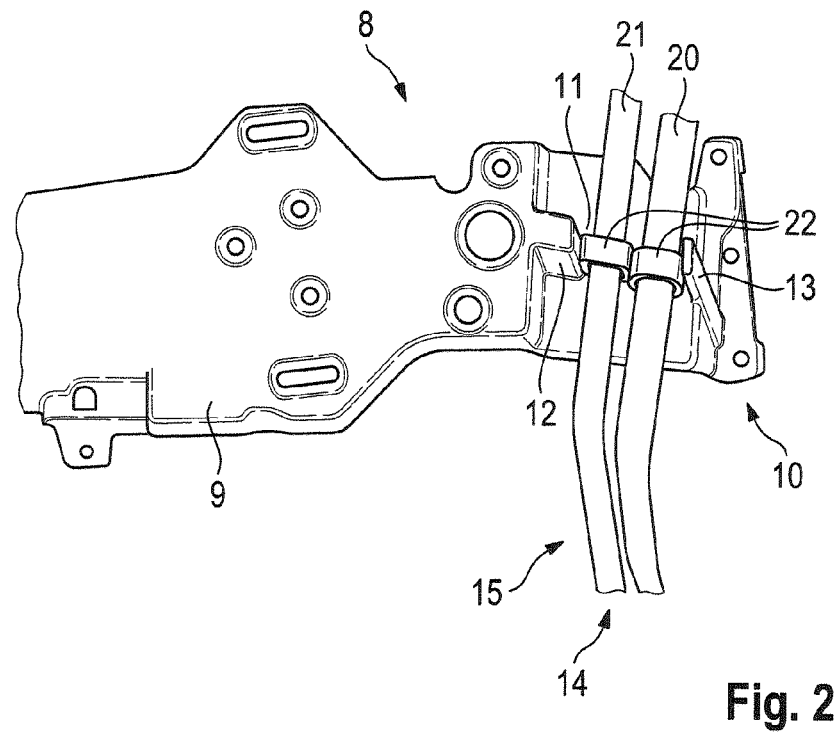
FIG. 2 is a three-dimensional view of a lateral end region of a rollover bar of the passenger motor vehicle, with a link pair of a linkage resting on said rollover bar, the respective link being provided with a buffer element.
Figure 3:
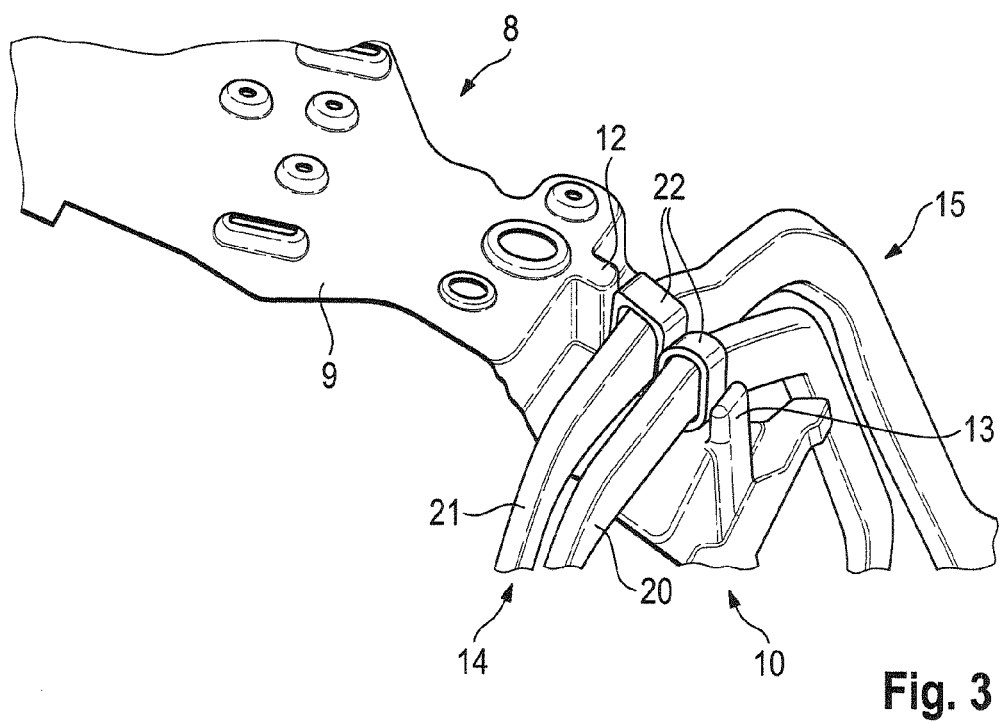
FIG. 3 shows the arrangement according to FIG. 2 in a different view.

The rollover bar 8 has an upper transverse bar section 9, the right end of which is shown in FIGS. 2 and 3. The left end of the transverse bar section 9, with respect to the forward driving direction of the passenger motor vehicle 1, is not shown, but is of correspondingly mirror-symmetrical configuration to right end illustrated in FIGS. 2 and 3. Opposite lateral ends of the upper transverse bar section 9 are connected to upright side beams (not shown). The bar section 9 is a shaped sheet metal part with an upwardly open a V-shaped depression 11 in the region of the end 10 of the bar section 9. The depression 11 is delimited by an inner and outer projections 12 and 13 of the bar section 9. A link pair 14 of a linkage 15 interacts with each depression 11 at the illustrated end 10 of the bar section 9. A roof 16 is shown in FIG. 1 and has a roof frame 17 with a surface hoop 18 articulated to be moved via the linkage 15 on both sides of the vehicle behind the rollover bar 8 or the trim 4 on the vehicle body 19. Thus, the roof 16 can be moved from the closed position where the roof 16 is between the upper frame section 3 of the windshield frame 2 and the rollover bar 8 or the trim 4, as shown in FIG. 1, and a storage position where the roof 16 is behind the rollover bar 8 or the trim 4. This movement takes place by means of a main link 20 and a control link 21 of the respective link pair 14 on the respective side of vehicle, such as the right side illustrated in FIGS. 2 and 3.

Each of the links 20 and 21 penetrates an annular buffer element 22 that is made of an elastic material. The buffer element is connected fixedly to the link 20 and 21 and hence cannot be displaced in the axial direction of the links 20 and 21. The trim sections 7 are situated in the open position when the roof 16 is moved forward from the stored position behind the rollover bar 8, and the two link pairs 14 pivot into a position of main link 20 and control link 21 and fit into the region of the associated depression 11 of the bar section 9 of the rollover bar 8. The links 20, 21 of the respective side of the vehicle are arranged in substantially parallel planes with respect to one another and move into the V-shaped depression 10 so that the two buffer elements 22 of the links 20, 21 come into contact with the projections 12 and 13. Increasing introduction of the links 20, 21 and their buffer elements 22 into the depression 11 causes the two buffer elements 22 to come into contact with one another. The end position of the links 20, 21 is illustrated in FIGS. 2 and 3 and corresponds to the closed position of the roof 16. In this position, the two buffer elements 22 that are assigned to the links 20, 21 contact the depression 21 in the bar section 9 both at the bottom and on the two sides that face the projections 12 and 13. As a result, the links 20 and 21 are guided laterally with respect to one another due to their indirect contact via their buffer elements 22, due to the sides of the depression 11 of the bar section 9 in the transverse direction of the bar section 9 and also in the vertical direction, due to the buffer elements 22 lying on the bar section 9 in the bottom region of the depression 11.

Figure 4:
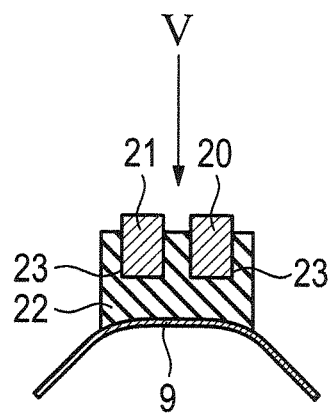
FIG. 4 is a simplified section through the rollover bar and a buffer element unit mounted to receive two links of a link pair.
Figure 5:
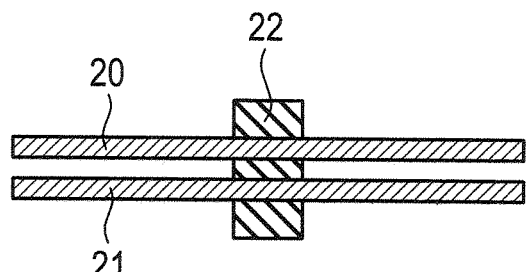
FIG. 5 is a view of the arrangement along the viewing direction V in FIG. 4.

FIGS. 4 and 5 show an alternative to such an extent that the buffer element 22 receives the respective link pair 14 that includes the main link 20 and the control link 21. In this embodiment, however, the buffer element 22 is connected to the bar section 9 of the rollover bar 8 on the upper side of the bar section 9. The links 20 and 21 therefore are not provided with a buffer element, but rather, during the transfer of the links 20, 21 into a position which corresponds to the closed position of the roof 16, move into depressions 23 or receptacles of the buffer element 22, which are adapted to the cross section of the links 20 and 21.

Figure 6:
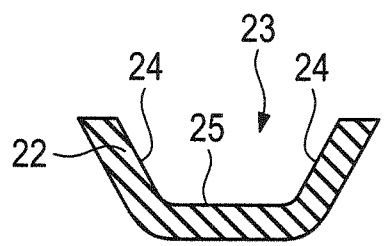
FIG. 6 is a modified buffer element, illustrated in cross section.

FIG. 6 illustrates a buffer element 22 which is modified with respect to that of FIGS. 4 and 5 to the extent that its depression 23 has a substantially V-shaped cross section, and is therefore configured as a V-shaped notch. The conical arrangement of the inner walls 24 guides the correspondingly configured link 20 or 21 precisely laterally and to the bottom of the depression 23.

The folding top of the passenger motor vehicle 1 also can have a fabric covering in addition to the roof 16 and the linkage 15. The fabric covering covers the roof and is connected partially to the roof frame 17 and the surface hoop 18. In the closed position, the roof frame 17 and the surface hoop 18 support the folding top fabric by bearing against the folding top fabric from underneath and supporting it over a large area or over the width of the roof arrangement.

What is claimed is:

1. A motor vehicle having a fixed rollover bar that spans a passenger compartment of the motor vehicle, and a removable roof that is articulated for movement via a linkage located at least partly behind the rollover bar on a vehicle body and configured for moving the roof from a closed position, in which the roof is arranged between a windshield frame and the rollover bar, and a storage position, in which the roof is arranged behind the rollover bar, longitudinally directed depressions being formed on the upper side of the rollover bar and links of the linkage being fixed transversely in the depressions when the roof is in the closed position and buffer elements being disposed at least partly between the rollover bar and the links.

2. The motor vehicle of claim 1, wherein the buffer elements are made at least partly of an elastic material.

3. The motor vehicle of claim 2, wherein the rollover bar has an upper, transversely running bar section having at least one depression on each side of the motor vehicle.

4. The motor vehicle of claim 3, wherein the bar section has a single depression on each side of the motor vehicle, one or two links being mounted in each of the depressions in the closed position of the roof.

5. The motor vehicle of claim 3, wherein the bar section has two depressions arranged laterally next to one another on each side of the motor vehicle, one link being mounted in each of depressions in the closed position of the roof.

6. The motor vehicle of claim 1, wherein the buffer elements are connected to the links.

7. The motor vehicle of claim 6, wherein each of the buffer elements encloses a link and is connected fixedly to the link.

8. The motor vehicle of claim 6, each of the buffer elements bears against at least one of the rollover bar and the buffer element of another of the links.

9. The motor vehicle of claim 1, wherein the buffer elements are connected to the rollover bar.

10. The motor vehicle of claim 9, the respective buffer element (22) is open on a side that faces away from the rollover bar.

11. The motor vehicle of claim 10, wherein the respective buffer element has a downwardly tapering receiving cross section for a link.

12. The motor vehicle of claim 11, wherein the respective depression has a downwardly tapering receiving cross section for at least one link provided with the buffer element.

\* \* \* \* \*